United States Patent [19]

Meshri et al.

[11] Patent Number: 5,785,770
[45] Date of Patent: Jul. 28, 1998

[54] BRAZING FLUX

[75] Inventors: Dayal T. Meshri; Sanjay D. Meshri; Dinshaw B. Contractor; Jennifer Parker, all of Tulsa, Okla.

[73] Assignee: Advance Research Chemicals, Inc., Catoosa, Okla.

[21] Appl. No.: 657,642

[22] Filed: May 30, 1996

[51] Int. Cl.$^6$ .................................................. B23K 35/00
[52] U.S. Cl. ............................ 148/26; 148/26; 148/24; 148/23; 148/22; 228/223
[58] Field of Search ........................... 148/26, 24, 23, 148/22; 228/223

[56] References Cited

U.S. PATENT DOCUMENTS

| | | | |
|---|---|---|---|
| 1,937,956 | 12/1933 | Henniger | 23/88 |
| 2,991,159 | 7/1961 | Wendt | 23/88 |
| 3,497,400 | 2/1970 | Stokes, Jr. et al. | 148/23 |
| 3,511,701 | 5/1970 | Mouton et al. | 117/206 |
| 3,951,328 | 4/1976 | Wallace et al. | 228/207 |
| 4,428,920 | 1/1984 | Willenberg et al. | 423/465 |
| 4,475,960 | 10/1984 | Yamawaki et al. | 148/26 |
| 4,579,605 | 4/1986 | Kawase et al. | 148/26 |
| 4,619,716 | 10/1986 | Suzuki et al. | 148/26 |
| 4,645,119 | 2/1987 | Haramaki et al. | 228/183 |
| 4,655,385 | 4/1987 | Suzuki et al. | 228/223 |
| 4,670,067 | 6/1987 | Suzuki et al. | 148/26 |
| 4,689,092 | 8/1987 | Suzuki et al. | 148/26 |
| 4,781,320 | 11/1988 | Fujiyoshi | 228/183 |
| 4,888,067 | 12/1989 | Sato et al. | 148/26 |
| 4,906,307 | 3/1990 | Fujiyoshi | 148/26 |
| 4,923,530 | 5/1990 | Miki et al. | 148/26 |
| 5,073,674 | 12/1991 | Olah . | |
| 5,100,048 | 3/1992 | Timsit | 229/198 |
| 5,171,376 | 12/1992 | Hignett et al. | 148/23 |
| 5,171,377 | 12/1992 | Shimizu et al. | 148/23 |
| 5,173,126 | 12/1992 | Ogura et al. | 148/23 |
| 5,190,596 | 3/1993 | Timsit | 148/23 |
| 5,232,788 | 8/1993 | Timsit et al. | 428/560 |
| 5,242,669 | 9/1993 | Flor | 423/465 |
| 5,318,764 | 6/1994 | Meshri et al. | 423/465 |
| 5,418,072 | 5/1995 | Baldantoni et al. | 428/558 |
| 5,697,045 | 12/1997 | Osame et al. | 419/48 |

FOREIGN PATENT DOCUMENTS 2241513  9/1991  United Kingdom ......... B23K 35/363

OTHER PUBLICATIONS

Phillips, et al., Dec. 1966, "Equilibria in KAIF$_4$-Containing Systems", Journal of The American Ceramic Society, vol. 49, No. 12, pp. 631-634.

Aluminum-Werke, "Producing Cryolite From Washing and Waste Liquors Containing Sodium Fluoride", Chemical Abstracts, 1956, vol. 51, pp. 7672 (a)(b).

J.W. Mellor, Inorganic and Theoretical Chemistry, 1946, vol. V, pp. 306-307, vol. II, pp. 516-517.

*Primary Examiner*—David A. Simmons
*Assistant Examiner*—M. Alexandra Elve
*Attorney, Agent, or Firm*—Fellers, Snider, Blankenship, Bailey & Tippens

[57] ABSTRACT

Brazing fluxes comprising a combination of a fluoroaluminate complex and selected metal fluorosilicates, including their method of manufacture and use, are disclosed.

11 Claims, 1 Drawing Sheet

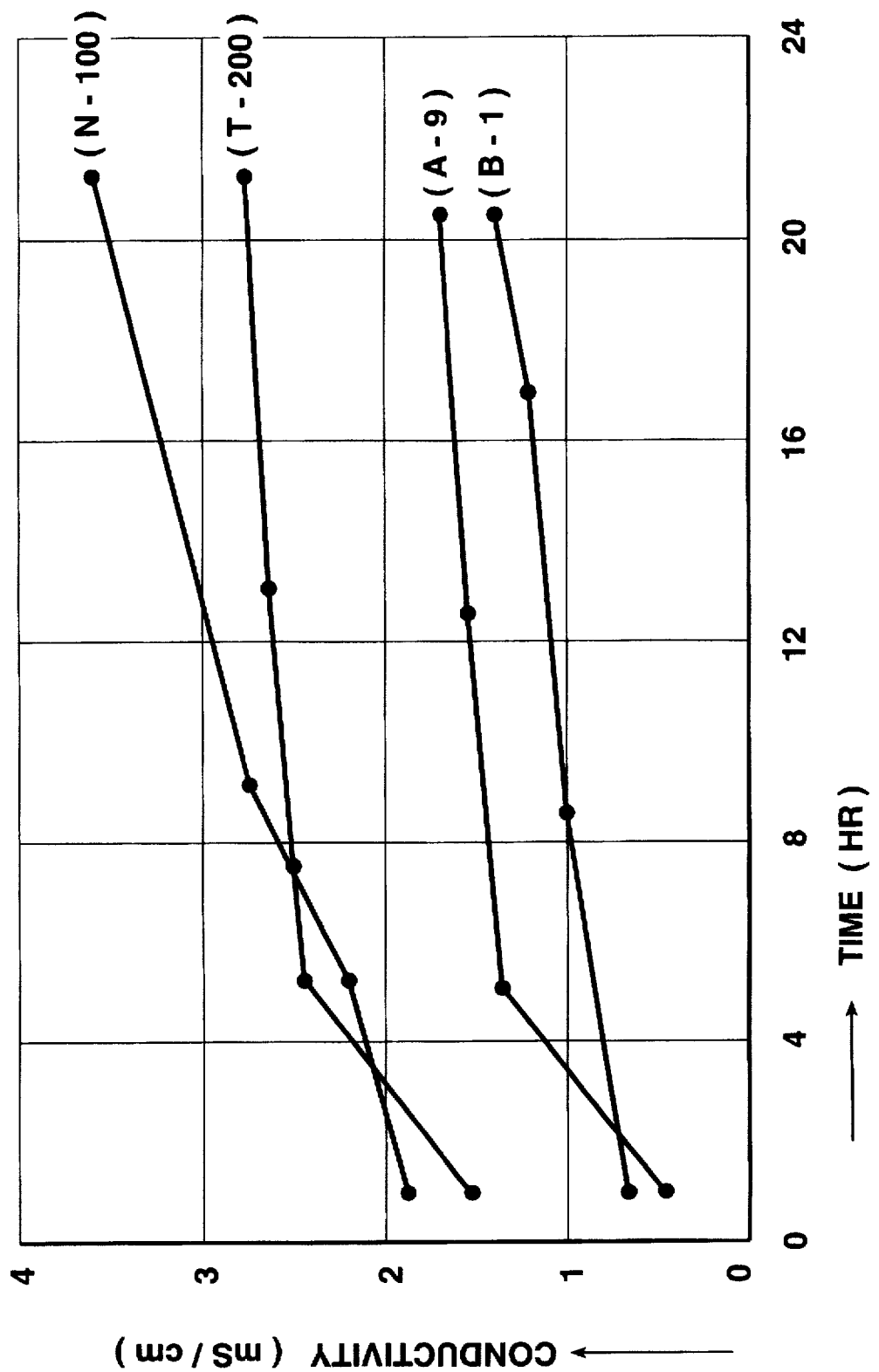

BRAZING FLUX

BACKGROUND OF THE INVENTION

1. Technical Field

The present invention relates generally to a flux used in the joining of aluminum surfaces by brazing, and, more specifically, to brazing fluxes comprising a combination of fluoroaluminate complexes and selected metal fluorosilicates, including their method of manufacture and use.

2. Background

Brazing is a way of joining two pieces of metal or metallic alloys. The metal components are bonded with a material known as a brazing filler metal. An important characteristic of the filler metal is that it have a melting point lower than that of the metals being joined. The filler metal is placed adjacent to and interposed between the component surfaces and the area is heated to a temperature sufficient to melt the filler metal without melting the component metals, whereupon the filler metal acts, simplistically speaking, as a metallic glue to join together the two pieces of metal.

Brazing is often used in the automotive industry in fabricating automotive condensers, radiators, evaporators and heaters and in the manufacture of heat exchangers where aluminum or aluminum alloys (collectively called "aluminum material") are employed to lighten weight. When aluminum material is brazed, it is common to use a brazing filler metal comprising a eutectic mixture of aluminum and silicon.

In order for the filler metal to bond strongly to the surfaces to be joined, the surfaces must be clean. A major problem in the brazing industry is the formation of metal oxides on the exterior of such surfaces. Aluminum, for example, oxidizes to form aluminum oxide in the presence of oxygen either from the air or absorbed on the metal's surface. Aluminum oxide has a very high melting point of about 2038° C. It neither melts nor is easily reduced to aluminum by temperatures that melt the aluminum metal itself.

A flux is a substance applied to the surfaces to be joined, and the brazing filler metal, to clean and free them from oxides and promote their union. The flux works to dissolve or otherwise remove metal oxides at the brazing temperature while not reacting with the metals to be joined. It also promotes the flow of the filler metal about and between the surfaces to be joined.

Chlorides, such as alkali metal chlorides and alkaline earth metal chlorides, mixed with alkali metal fluorides have been used as a flux in the brazing of aluminum material. However, these mixtures are very hygroscopic, absorbing moisture from the air, and were discovered to leave a corrosive residue upon the joined metals which necessitated washing the metal components after brazing.

In response to this problem, so-called non-corrosive fluxes for aluminum material were developed. Two of the most popular are sold under the trademarks NOCOLOK™ and LALHAR™. These non-corrosive fluxes comprise a mixture of potassium fluoroaluminate complexes. As used herein the term "fluoroaluminate complexes" or "fluoroaluminate fluxes" refers to complexes of the type formed by fusion of aluminum fluoride ($AlF_3$) and potassium fluoride (KF), two such complexes being generally known as potassium tetrafluoroaluminate ($KAlF_4$) and potassium hexafluoroaluminate ($K_3AlF_6$). Of the two most popular non-corrosive fluxes, one comprises a mixture of about eighty-five percent (85%) $KAlF_4$ and fifteen percent (15%) $K_3AlF_6$, while the other is composed of around ninety to ninety-five percent (90–95%) $KAlF_4$ and five to ten percent (5–10%) $K_3AlF_6$. These compounds, and their method of manufacture, are disclosed in U.S. Pat. Nos. 3,951,328 and 5,318,764, which patents are incorporated herein by reference.

While the fluoroaluminate fluxes are very effective, they are, unfortunately, very selective. They are extremely useful for brazing the lower series of aluminum alloys, i.e. the 1000–3000 series. These are alloys which contain only aluminum and silica. These alloys are comparatively soft in that they are not easily machined or threaded. Specialized tools and skillful workmanship is required to machine these alloys.

The fluoroaluminate fluxes are not suitable, however, for the higher series alloys, i.e. the 4000–6000 series, which contain higher levels of magnesium, silicon, copper and zinc. These alloys are heat treatable and have higher strengths for structural formation and machining and are therefore very useful and desired. But in the presence of air these alloys form oxides not dissolvable or removable with the known fluxes.

It is thus an object of this invention to provide a flux capable of dissolving or otherwise removing metal oxides in brazing a wide series of aluminum alloys, including the 4000–6000 series.

It is a further object of this invention that the flux be less hygroscopic that known fluxes, inexpensive to manufacture, extremely non-corrosive and easy to handle.

SUMMARY OF THE INVENTION

The idea was conceived to synthesize a compound that can act as an oxygen scavenger in situ and also as an etchant to remove oxygen from the surface of magnesium and aluminum. It was thought that this compound might then be added to fluoroaluminate complexes to lower their melting points and increase their utility with respect to the higher series of aluminum alloys.

Silicon tetrafluoride ($SiF_4$) is known to be commercially used in cleaning metal surfaces in the semiconductor industry and also as an oxygen scavenger. Its commercial use, however, has extreme disadvantages, as silicon tetrafluoride is a compressed gas required to be stored in high pressure cylinders and needing special equipment for safe handling. Besides storage and handling dangers, high quality $SiF_4$ is very expensive. To use this substance in the brazing industry to remove oxygen from the surface of aluminum and aluminum alloys containing magnesium, zinc, copper and other metals would be overly burdensome and dangerous and, moreover, cost prohibitive.

Metal fluorosilicates, though, when heated, produce $SiF_4$. Thus sprang the idea of generating $SiF_4$ from a solid-solid mixture in situ to clean the surface of metal components during brazing, incorporating the fluorine of $SiF_4$ as a fluorinating agent and rendering the surfaces to be joined oxygen free.

The objects and advantages of the present invention are accordingly attained by adding metal fluorosilicates to the known fluoroaluminate complexes. This improves the quality of the commercially available fluoroaluminate fluxes, increasing their range of effectiveness to include those higher series aluminum alloys which are suitable for machining.

The preferred metal fluorosilicates include alkali metal fluorosilicates, alkali bimetal fluorosilicates and/or alkali metal bifluorosilicates, or their mixtures. The new flux compositions preferably comprise a combination of eighty to ninety-nine and nine-tenths percent (80–99.9%) of a fluoroaluminate complex and one-tenth to twenty percent (0.1–20%) of the alkali metal fluorosilicate, alkali bimetal fluorosilicate and/or alkali metal bifluorosilicate, or their mixtures.

The preferred alkali metal fluorosilicates include cesium hexafluorosilicate ($Cs_2SiF_6$), potassium hexafluorosilicate ($K_2SiF_6$), lithium hexafluorosilicate ($Li_2SiF_6$), rubidium hexafluorosilicate ($Rb_2SiF_6$) and ammonium hexafluorosilicate (($NH_4$)$_2SiF_6$).

The preferred alkali bimetal fluorosilicates include potassium cesium hexafluorosilicate ($KCsSiF_6$), lithium cesium hexafluorosilicate ($LiCsSiF_6$), rubidium cesium hexafluorosilicate ($RbCsSiF_6$), rubidium potassium hexafluorosilicate ($RbKSiF_6$) and ammonium cesium hexafluorosilicate ($NH_4CsSiF_6$).

The preferred alkali metal bifluorosilicates (also referred to as alkali metal hydrofluorosilicates) include cesium hydrofluorosilicate ($CsHSiF_6$), potassium hydrofluorosilicate ($KHSiF_6$), lithium hydrofluorosilicate ($LiHSiF_6$), and ammonium hydrofluorosilicate ($NH_4HSiF_6$).

The advantages of these new flux mixtures are numerous. They are effective in brazing a broad range of aluminum alloys, including those higher series alloys containing magnesium. While providing oxygen scavenger $SiF_4$ in situ, they are easy to handle, requiring no special storage or application equipment. The new flux mixtures are not hygroscopic and are inexpensive to manufacture.

The fluxes of the present invention have proven so effective that in certain cases brazing filler metals need not be used to achieve excellent bonds. For example, when the percentage of metal fluorosilicate is in the most preferred range of seven to fifteen percent (7–15%) it is possible to braze without a filler metal. There is sufficient silicon released from the metal fluorosilicate in situ to be incorporated into the aluminum base metal during the brazing process. Neither is cladding required of the surfaces to be brazed.

The hexafluorosilicates are easily prepared from very inexpensive hexafluorosilic acid ($H_2SiF_6$), which is readily available from fertilizer industries.

Still other objects and advantages of the present invention will become readily apparent to those skilled in this art from the following detailed description, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature, and not as restrictive.

BRIEF DESCRIPTION OF THE DRAWINGS

FIG. 1 is a graph showing the change in conductivity over time of two flux compositions of the present invention and two known flux compositions.

DETAILED DESCRIPTION OF THE PREFERRED EMBODIMENTS

It has been discovered that certain metal fluorosilicates when combined with conventional potassium fluoroaluminate complexes yield the desired properties of a broad range brazing flux. The preferred metal fluorosilicates include alkali metal fluorosilicates, alkali bimetal fluorosilicates and/or alkali metal bifluorosilicates, or their mixtures.

The alkali metal fluorosilicates may be described formulaically as $M_2SiF_6$, where M equals the metal component. The preferred alkali metal fluorosilicates include cesium hexafluorosilicate ($Cs_2SiF_6$). Taking $Cs_2SiF_6$ as an example, the known method of making the composition entails reacting cesium hydroxide (CsOH) with hexafluorosilic acid ($H_2SiF_6$) in the following manner:

$$2CsOH + H_2SiF_6 \rightarrow Cs_2SiF_6 + 2H_2O$$

This method, however, is somewhat expensive, as the cost of CsOH is relatively high. Accordingly, other alkali metal fluorosilicates, such as potassium hexafluorosilicate ($K_2SiF_6$), lithium hexafluorosilicate ($Li_2SiF_6$), rubidium hexafluorosilicate ($Rb_2SiF_6$) and ammonium hexafluorosilicate (($NH_4$)$_2SiF_6$), were developed and tested and were discovered to be useful for the intended purpose and less expensive to make.

The preferred alkali metal fluorosilicates are synthesized according to the general formula:

$$2MOH + H_2SiF_6 \rightarrow M_2SiF_6 + 2H_2O$$

wherein stoichiometric amounts of alkali metal hydroxides are reacted with $H_2SiF_6$ to yield the desired alkali metal fluorosilicates. Shown in the ensuing illustrations are the reactions for synthesizing the most preferred alkali metal fluorosilicates:

$$2KOH + H_2SiF_6 \rightarrow K_2SiF_6 + 2H_2O$$

$$2Li(OH) + H_2SiF_6 \rightarrow Li_2SiF_6 + 2H_2O$$

$$2Rb(OH) + H_2SiF_6 \rightarrow Rb_2SiF_6 + 2H_2O$$

$$2NH_4(OH) + H_2SiF_6 \rightarrow (NH_4)_2SiF_6 + 2H_2O$$

Likewise, bimetal fluorosilicates ($MM'SiF_6$) such as potassium cesium hexafluorosilicate ($KCsSiF_6$), lithium cesium hexafluorosilicate ($LiCsSiF_6$), rubidium cesium hexafluorosilicate ($RbCsSiF_6$), rubidium potassium hexafluorosilicate ($RbKSiF_6$) and ammonium cesium hexafluorosilicate ($NH_4CsSiF_6$) are encompassed in the present invention. These compositions are synthesized by the stoichiometric addition of two alkali metal hydroxides to $H_2SiF_6$ in accordance with the general formula:

$$MOH + M'OH + H_2SiF_6 \rightarrow MM'SiF_6 + 2H_2O$$

and as exemplified below:

$$KOH + Cs(OH) + H_2SiF_6 \rightarrow KCsSiF_6 + 2H_2O$$

$$Li(OH) + Cs(OH) + H_2SiF_6 \rightarrow LiCsSiF_6 + 2H_2O$$

$$Rb(OH) + Cs(OH) + H_2SiF_6 \rightarrow RbCsSiF_6 + 2H_2O$$

$$Rb(OH) + KOH + H_2SiF_6 \rightarrow RbKSiF_6 + 2H_2O$$

$$NH_4(OH) + Cs(OH) + H_2SiF_6 \rightarrow NH_4CsSiF_6 + 2H_2O$$

The alkali metal bifluorosilicates ($MHSiF_6$), such as cesium hydrofluorosilicate ($CsHSiF_6$), potassium hydrofluorosilicate ($KHSiF_6$), lithium hydrofluorosilicate ($LiHSiF_6$), and ammonium hydrofluorosilicate ($NH_4HSiF_6$), may be formed by the adjustment of the stoichiometric addition of alkali metal hydroxides to $H_2SiF_6$ as per the general formula:

$$MOH + H_2SiF_6 \rightarrow MHSiF_6 + H_2O$$

and as shown in the following illustrations:

$$Cs(OH) + H_2SiF_6 \rightarrow CsHSiF_6 + H_2O$$

$$KOH + H_2SiF_6 \rightarrow KHSiF_6 + H_2O$$

$$Li(OH) + H_2SiF_6 \rightarrow LiHSiF_6 + H_2O$$

$$Rb(OH) + H_2SiF_6 \rightarrow RbHSiF_6 + H_2O$$

$$NH_4(OH) + H_2SiF_6 \rightarrow NH_4HSiF_6 + H_2O$$

Alternatively, the alkali metal bifluorosilicates may be synthesized by the stoichiometric addition of metal carbonates ($M_2CO_3$) to $H_2SiF_6$ in the manner of:

$$M_2CO_3 + 2H_2SiF_6 \rightarrow 2MHSiF_6 + 2H_2O + CO_2$$

TABLE 1

| COMPOSITION | wt. % $KAlF_4$ | wt. % $Cs_2SiF_6$ | BRAZE RESULTS WITH FILLER METAL | BRAZE RESULTS WITHOUT FILLER METAL |
|---|---|---|---|---|
| A-1 | 100 | 0 | GOOD | NONE |
| A-2 | 99 | 1 | GOOD | NONE |
| A-3 | 98 | 2 | GOOD | NONE |
| A-4 | 97 | 3 | EXCELLENT | NONE |
| A-5 | 96 | 4 | EXCELLENT | NONE |
| A-6 | 93 | 7 | EXCELLENT | GOOD |
| A-7 | 92 | 8 | EXCELLENT | GOOD |
| A-8 | 91 | 9 | EXCELLENT | GOOD |
| A-9 | 90 | 10 | EXCELLENT | EXCELLENT |
| A-10 | 85 | 15 | GOOD | EXCELLENT |
| A-11 | 70 | 30 | POOR | POOR |

Braze results by the employment of the fluxes made in accordance with the present invention were excellent for articles made from lower series aluminum alloys as well as articles made from higher series alloys, such as those containing magnesium. Table 2 below shows the braze results of various combinations (B1–B9) of $KAlF_4$ and $Cs_2SiF_6$ as used in connection with different types of aluminum alloys.

TABLE 2

| COMPOSITION | wt. % $KAlF_4$ | wt. % $Cs_2SiF_6$ | BRAZE RESULTS WITH A3003 ALLOY | BRAZE RESULTS WITH A6063 ALLOY | BRAZE RESULTS WITH A6061 ALLOY |
|---|---|---|---|---|---|
| B-1 | 97 | 3 | EXCELLENT | EXCELLENT | GOOD |
| B-2 | 96 | 4 | EXCELLENT | EXCELLENT | GOOD |
| B-3 | 93 | 7 | EXCELLENT | EXCELLENT | GOOD |
| B-4 | 92 | 8 | EXCELLENT | EXCELLENT | GOOD |
| B-5 | 91 | 9 | EXCELLENT | EXCELLENT | EXCELLENT |
| B-6 | 90 | 10 | EXCELLENT | EXCELLENT | EXCELLENT |
| B-7 | 85 | 15 | EXCELLENT | EXCELLENT | EXCELLENT |
| B-8 | 70 | 30 | NONE | NONE | NONE |
| B-9 | 60 | 40 | NONE | NONE | NONE |

The metal fluorosilicates or their mixtures are combined with one or more fluoroaluminate complexes, e.g. $KAlF_4$ or $K_3AlF_6$ or their mixtures (preferably $KAlF_4$), to obtain the improved fluxes of the present invention. The preferred combinations include eighty to ninety-nine and nine-tenths percent (80–99.9%) of a fluoroaluminate complex and one-tenth to twenty percent (0.1–20%) of the metal fluorosilicate.

TESTS AND EXPERIMENTS

Experiments conducted on the present invention confirm the working range of the new flux compositions. Table 1 below shows the braze results obtained through the use of various combinations (A1–A11) of $KAlF_4$ and $Cs_2SiF_6$ with and without a filler metal.

The A3003 alloy is an aluminum/silicon alloy containing no magnesium. Similarly, the A6063 and A6061 are aluminum/silicon alloys. However, these 6000 series alloys also contain magnesium, which, as discussed above, poses problems for conventional fluxes. The fluxes of the present invention were shown to overcome the limitations of the conventional compositions.

Table 3 shows braze results using combinations (C1–C10) of a bimetal fluorosilicate ($CsKSiF_6$) and an alkali metal bifluorosilicate ($CsHSiF_6$) with and without a filler metal.

TABLE 3

| COMPOSITION | wt. % KAlF$_4$ | wt. % CsKSiF$_6$ | wt. % CsHSiF$_6$ | BRAZE RESULTS WITH FILLER METAL | BRAZE RESULTS WITHOUT FILLER METAL |
|---|---|---|---|---|---|
| C-1 | 100 | 0 | 0 | GOOD | NONE |
| C-2 | 98 | 1.5 | .5 | GOOD | NONE |
| C-3 | 97 | 2.5 | .5 | GOOD | NONE |
| C-4 | 96 | 3 | 1 | VERY GOOD | NONE |
| C-5 | 93 | 5 | 2 | VERY GOOD | GOOD |
| C-6 | 92 | 6 | 2 | EXCELLENT | GOOD |
| C-7 | 91 | 6 | 3 | EXCELLENT | GOOD |
| C-8 | 90 | 7 | 3 | EXCELLENT | EXCELLENT |
| C-9 | 85 | 10 | 5 | GOOD | EXCELLENT |
| C-10 | 70 | 20 | 10 | NONE | NONE |

Good to excellent braze results were obtained without the use of a filler metal in a most preferred range.

Another experiment was conducted in order to examine the insolubility of the fluxes of the invention. Insolubility is related to the corrosive characteristic of fluxes in that fluxes that are insoluble in water are accordingly non-corrosive. In the experiment, plates that had been brazed with flux compositions A-9 and B-1 and had not been washed in water were cut into small pieces and immersed into ion-exchange water having a temperature of 40° C. The volume of ion-exchange water was such that should the total amount of flux sprayed onto the plate be dissolved into the ion-exchange water, the concentration of dissolved flux would be twenty (20). The higher the concentration of dissolved flux, the higher the electrical conductivity of the water. Aluminum coupons having the same dimensions as those used with compositions A-9 and B-1 and brazed with known non-corrosive fluxes, designated as N-100 and T-200, were cut likewise into small pieces and immersed into ion-exchange water. As shown in FIG. 1, the flux compositions of the present invention are extremely insoluble, more so than known commercial fluxes, and are, accordingly, extremely non-corrosive.

While the invention has been described with a certain degree of particularity, it is manifest that many changes may be made in the method hereinabove described without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A flux for use in brazing aluminum and aluminum alloy metals, comprising:
   (a) eighty to ninety-nine and nine-tenths weight percent (80–99.9 wt. %) of a fluoroaluminate complex; and
   (b) one-tenth to twenty weight percent (0.1–20 wt. %) of a metal flurosilicate.

2. The flux according to claim 1, wherein said fluoroaluminate complex consist essentially of KAlF$_4$.

3. The flux according to claim 1, wherein said fluoroaluminate complex consist essentially of a mixture of KAlF$_4$ and K$_3$AlF$_6$.

4. The flux according to claim 1, wherein said metal fluorosilicate is an alkali metal fluorosilicate having the formula M$_2$SiF$_6$, wherein M equals cesium, potassium, lithium, rubidium or ammonium.

5. The flux according to claim 1, wherein said metal fluorosilicate is a bimetal fluorosilicate having the formula MM'SiF$_6$, wherein M and M' are selected from the group consisting of cesium, potassium, lithium, rubidium and ammonium.

6. The flux according to claim 1, wherein said metal fluorosilicate is an alkali metal hydrofluorosilicate having the formula MHSiF$_6$, wherein M equals cesium, potassium, lithium, rubidium or ammonium.

7. The flux according to claim 1, wherein said metal fluorosilicate is in the range of seven to fifteen weight percent (7–15 wt. %).

8. A method of joining by brazing surfaces of aluminum or aluminum alloys, a brazing filler metal having been placed adjacent to and interposed between the surfaces to be joined, comprising:

(a) contacting said surfaces to be joined and said brazing filler metal with a flux, said flux comprising eighty to ninety-nine and nine-tenths weight percent (80–99.9 wt. %) of a fluoroaluminate complex and one-tenth to twenty weight percent (0.1–20 wt. %) of a metal fluorosilicate; and (b) heating said brazing filler metal and said flux to a temperature above the melting point of said brazing filler metal so as to join said surfaces.

9. A flux for brazing aluminum and aluminum alloy metals, including alloys containing magnesium, without the necessity of using a filler metal, said flux comprising about ninety-three to ninety-five weight percent (93–95 wt. %) of a fluoroaluminate complex and about five to seven weight percent (5–7 wt. %) Cs$_2$SiF$_6$.

10. A method of joining surfaces of aluminum or aluminum alloys, including alloys containing magnesium, comprising:

(a) applying the composition of claim 9 to said surfaces; and (b) without interposing a filler metal between said surfaces, heating said composition to a temperature above it s melting point so as to join said surfaces.

11. A flux for use in brazing aluminum and aluminum alloy metals comprising a product formed by mixing eight to ninety-nine and nine-tenths weight percent (80–99.9 wt. %) of a fluoroaluminate complex and one-tenth to twenty weight percent (0.1–20 wt. %) of a metal fluorosilicate.

* * * * *